Jan. 4, 1966    J. F. BELAIEFF    3,227,818
CYCLE CONTROL HOLDER AND SWITCH FOR HOUSEHOLD APPLIANCES
Filed June 8, 1962    2 Sheets-Sheet 1

INVENTOR
JAMES F. BELAIEFF

BY
AGENT

Jan. 4, 1966   J. F. BELAIEFF   3,227,818
CYCLE CONTROL HOLDER AND SWITCH FOR HOUSEHOLD APPLIANCES
Filed June 8, 1962   2 Sheets-Sheet 2

INVENTOR
JAMES F. BELAIEFF

BY
AGENT

United States Patent Office 3,227,818
Patented Jan. 4, 1966

3,227,818
CYCLE CONTROL HOLDER AND SWITCH FOR HOUSEHOLD APPLIANCES
James Frank Belaieff, Geneva, Switzerland, assignor to Frame Societe Anonyme, Fribourg, Switzerland
Filed June 8, 1962, Ser. No. 201,152
Claims priority, application Switzerland, June 6, 1961, 6,549/61; July 14, 1961, 8,298/61
2 Claims. (Cl. 200—5)

The invention relates to a control device for closing and opening multiple electric circuits with the aid of a set of push-buttons which operate electric contacts, said device having for each desired combination a plate, the large surface of which, is provided with projections and recesses opposite push-buttons to be operated or not operated respectively, said plate being maintained by a guide device in a position with respect to the push-buttons such that the apertures in the said plate correspond to certain push-buttons so that the latter enter into the said apertures with the result they are not operated when the plate is brought into the operative position.

The present invention is characterized in that the plate is arranged in the guiding device so as to be adapted to pivot about one edge, means being provided for maintaining the plate in the operative position against the action of the push-buttons.

In order that the invention may readily be carried into effect, embodiments thereof will now be described, by way of example, with reference to the accompanying diagrammatic drawings, in which.

Figure 3:
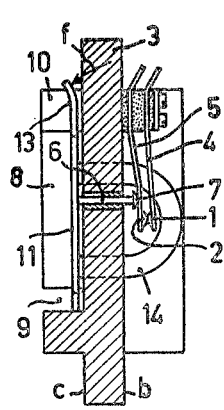
FIGURE 3 is a sectional view taken along the line III—III of FIGURE 1.
Figure 1:
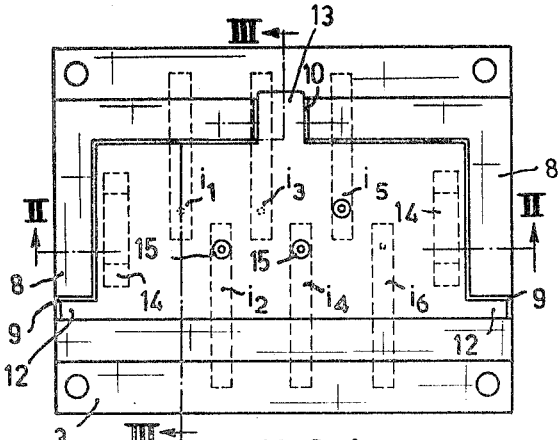
FIGURE 1 is a front elevation of a first embodiment of a control device.
Figure 2:
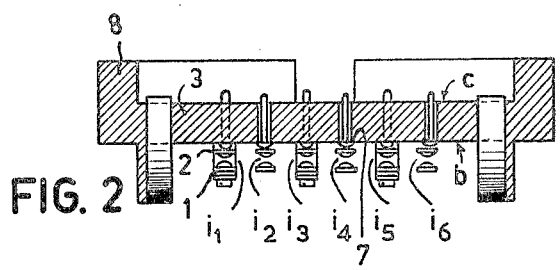
FIGURE 2 is a sectional view of the control device of FIGURE 1 taken along the line II—II of FIGURE 1, the interchangeable control member being withdrawn.

In FIGURES 1 to 3 the control device comprises switches $i_1$, $i_2$, $i_3$, $i_4$, $i_5$, and $i_6$ each of which consist of a fixed contact 1 and a moving contact 2. The fixed and moving contacts are each mounted at the free end of a strip 4 and 5 respectively, the other end of which is rigidly secured in any known manner to the chassis 3. The strip 4 is comparatively rigid while the strip 5 is constituted of a spring the elasticity of which tends to maintain the switch in the open position.

The said flexible strip 5 in its rest position pushes back a push-button 6 which slides in a guide provided in the chassis. The rest position of the push-button is defined by a shoulder 7 thereof butting against the rear side $b$ of the chassis. The other end of each push-button 6 protrudes from the front side $c$ of the chassis. A guide frame 8 is secured to this front side of the chassis so as to surround the push-button 6. The frame is provided with two opposed lateral slots 9 and an upper aperture 10. The guide frame is adapted to accommodate an interchangeable control member 11 which is maintained in the operative position (the position shown in FIGURES 1 and 3) by a holding device. The control member 11, which consists of a plate of ferromagnetic material, has two opposite lugs 12 adapted to engage in the opposite lateral slots 9 and a tag 13 adapted to engage in the upper aperture 10. The opposite lugs 12 when engaged in the lateral slots 9 effectively form two journals and associated bearings.

The holding device comprises two permanent magnets 14 which are secured on the chassis 3 and the pole faces of which slightly protrude from the front side $c$.

The plate 11 is provided with apertures 15 arranged opposite certain ones of the push-buttons 6.

The device described operates as follows:

The operator inserts the journals 12 in the bearings 9 and then pivot the plate so as to introduce it in the guiding frame.

During the pivotal movement the attraction of the permanent magnets increases progressively up to the instant at which it rapidly moves the plate into the position shown in FIGURES 1 and 3. During this rapid movement of the plate 11 the push-buttons 6 are pushed back against the action of the flexible strips 5 and cause the switches $i_1$ ... $i_6$ to close. The push-buttons 6 disposed opposite apertures 15 enter into these apertures and hence are not operated. Thus according to the position of the apertures 15 provided in the plate 11 the desired switches $i_1$ ... $i_6$ are closed. Since the apertures 15 are disposed differently in each plate of a set of interchangeable control members, it will be appreciated that to each plate 11 placed in the operative position corresponds to a predetermined connection of the electric circuits controlled by the switches $i_1$ to $i_6$.

The ferromagnetic plate 11 is maintained in position by the magnetic attraction of the permanent magnets and in order to remove the plate the operator exerts a thrust $f$ (FIG. 1) on the tag 13 and then removes the plate. It will be appreciated that the control device may comprise any number of switches up to 20 and more. Further the switches may be simple as shown or multiple. The push-buttons 6 may alternatively operate change-over switches or commutators.

From the drawing and the above discussion it will be readily seen that the described control device permits of a considerable number of different commutations while retaining complete reliability. The various plates of a set of control members preferably are marked in any suitable manner, for example, by different colours, each colour corresponding to a particular operation of the apparatus or machine provided with the described control device. It will be appreciated that the control device may be provided with push-button switches of any known type, for example, commercially available switches, commutators and change-over switches.

Figures 4, 5:
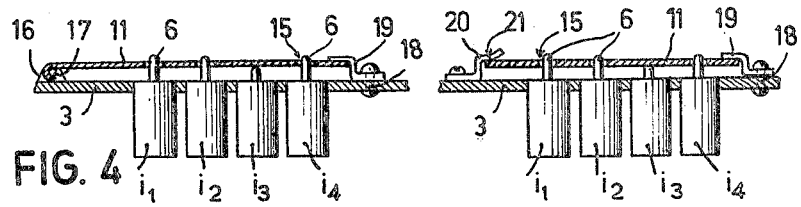
FIGURES 4 to 6 are diagrammatic sectional views of three modified embodiments.

In the modified embodiment shown in FIGURE 4 each switch member $i_1$ etc. is provided with a slidable pin 6 which is normally not closed. The pins may be brought into engagement with a control member 11 hinged by pin 17, after which the plate 11 is held in its operative position (shown) and maintained in this position by a bolt 19 pivoted upon a pin 18.

In the modified embodiment shown in FIGURE 5 one of the edges of the plate 11 may be inserted in a rail 20 secured on chassis 3. The plate may be inserted under the rail portion 21 at an angle to the chassis and then swung into the operative position. The retaining face 21 and bolts 19 maintain the plate 11 in the operative position.

Figure 6:
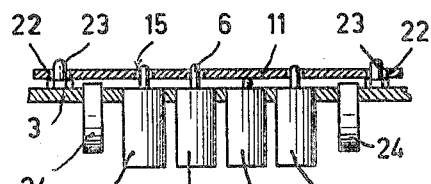

In the modified embodiment shown in FIGURE 6 the ferromagnetic plate 11 is provided with guide orifices 22 (only two of which are shown). The orifices 22 are intended to co-operate with guiding pins 23 secured to the front side of the chassis. The plate 11 is then drawn into the operative position shown by two permanent magnets 24.

Many other embodiments are possible without departing from the scope of the invention. Thus the apertures 15 may be replaced by depressions or grooves. In another modified embodiment of the plate 11 one of its larger sides may be provided with slots, grooves or projections disposed opposite the push-buttons to be operated or not operated. Furthermore the switches $i_1$ to $i_6$ or some of them may be opening switches, that is to say that operation of the respective push-buttons by the plate 11 results in electric contacts being opened.

Figure 7:
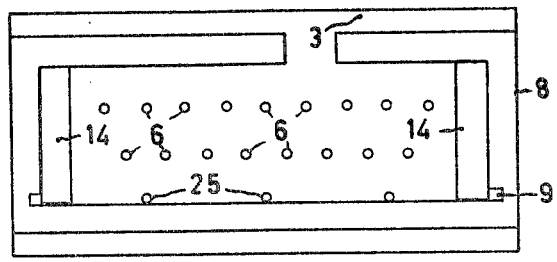
FIGURE 7 is a front elevation of a second embodiment of the control device, the control member being withdrawn.
Figure 8:
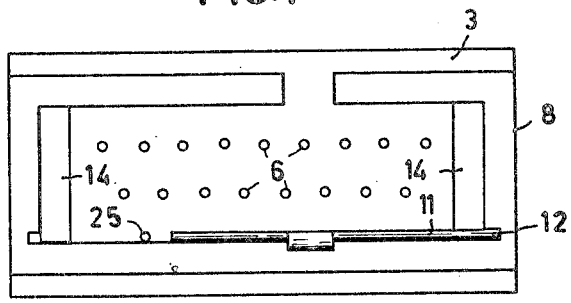
FIGURE 8 is a front elevation of the embodiment shown in FIGURE 7, the control member being in a first operative position.
Figure 9:
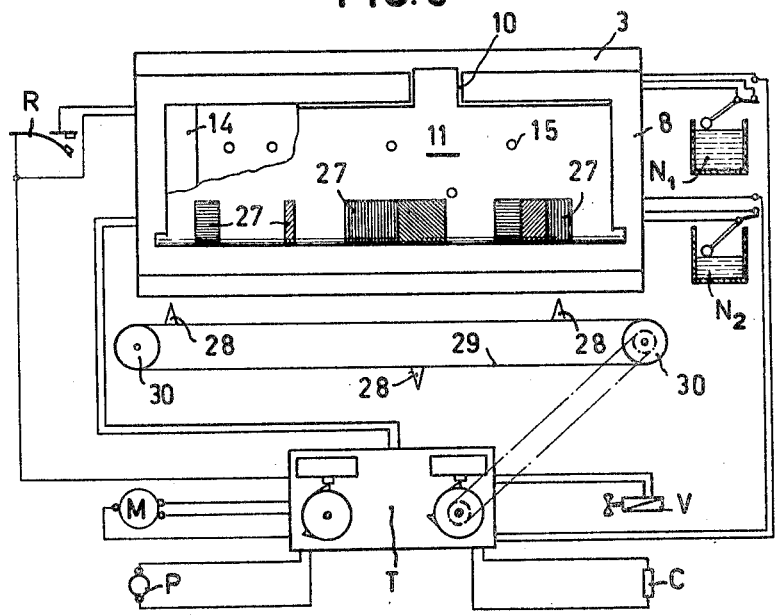
FIGURE 9 is a front elevation of the second embodiment of the control device, the control member being in a second operative position, whilst the various components of the automatic control of a washing machine are shown diagrammatically.

The second embodiment of the control device shown in FIGURES 7 to 9 is especially intended for controlling washing machines. This control device comprises, similarly to the first embodiment, switches secured to a chassis 3 and adapted to be operated by means of push-buttons 6 from the front side of the chassis. A frame 8 secured to the front side of the chassis is provided with two opposite lateral slots 9 and with an upper aperture 10 which is disposed asymetrically with respect to the lateral slots of the frame 8.

In this second embodiment the two permanent magnets 14 are each constituted by a transversely magnetized plate presenting along its entire length narrow sides constituting poles of opposite sign.

This arrangement enables a control member, which similarly to the first embodiment, is a plate 11, to be fixed in the frame 8 in two different positions, that is to say, an open position and a closed or operative position.

The operator can place the plate 11 in an open position (FIGURE 8) in which the plate is disposed approximately at right angles to the front side of the chassis 3. The plate 11 is maintained in this position by permanent magnets 14 drawing the narrow side or end of the plate to the front side of the chassis as above described.

In this second embodiment switches are provided, the push-buttons 25 of which protrude from the front side of the chassis on a line joining the two slots 9 of the frame 8. Thus when the plate 11 is fixed in its open position (FIGURE 8) it operates the push-buttons 25 by its narrow side so that certain connections are made with the aid of the switches.

From this open position the plate 11 may be moved pivotally about the journals 12 into the operative position shown in FIGURE 9.

The plate 11 is provided similarly to the plate described with reference to the first embodiment with apertures 15 through which the ends of push-buttons 6 may pass when the plate is in its operative position.

Similary to the first embodiment the control device comprises a set of plates 11 having apertures 15 arranged in different relative positions so that each plate when in the operative position produces a pre-determined connection of the electric circuit controlled by the switches.

FIGURE 9 shows diagrammatically a control device associated with a central switchboard or timer T of the type disclosed in U.S.P. 3,015,003 for controlling the various cycles of a washing machine. This washing machine comprises similarly to existing machines a heater C, a thermostat R, a draining pump P, a driving motor M, a water inlet valve V and two level regulators $N_1$ and $N_2$.

Any different cycles of operations which the washing machine may perform is chosen by means of a plate 11 the holes 15 and slots 9 of which occupy relative positions corresponding to the positions of the switches which are not to be operated for the circuit arrangement corresponding to the cycle controlled by the said plate.

In this second embodiment of the control device each plate is provided with an indicator 27 of a diagrammatic arrangement enabling the operator to see at any moment which operation is being performed. A pointer 28 is mounted on an endless cord 29 passing over two pulleys 30. One of these pulleys is driven from the switchboard T so as to move over the dial 27 during the performance of the cycle of operation. In the embodiment shown the cord 29 carries three pointers 28 so that when a pointer on termination of the cycle reaches the end of the indicator another pointer is in the cycle starting position.

The indicator of each plate indicates only the operations controlled by this plate. The operations of the complete cycle which are omitted in a partial cycle which does not comprise the entire sequence of operations are not shown on the indicator of the corresponding plate. When such a cycle is being performed the pointer driven from the switchboard skips the operations which are omitted so that the operator always knows which operation the machine is carrying out, and is not misled by useless indications.

Obviously the pointer and its drive may alternatively be designed differently in any known manner.

The circuits may be connected so that when the operator during a cycle moves the plate from its operative position to its open position the operation being performed is stopped and the switchboard skips all the following operations with the exception of the final draining so that the machine is again in the rest position and ready to commence any cycle.

However, this arrangement has a drawback when the operator realizes immediately after having started the machine that he has taken the wrong plate and hence the wrong cycle. When he then moves the plate to the open position he loses the washing liquid which contains the soap and/or detergent and generally is still fresh.

To avoid this loss of washing liquid, when the operator realizes his error he entirely withdraws the plate, which corresponds to a connection of the circuit such that the operation being performed is stopped and all the subsequent operations including the final draining are skipped so that the machine is ready to recommence a new cycle with, however, the tub being already filled with washing liquid.

The second embodiment of the control device, which includes two operative positions of the plates 11, gives a great versatility and increase possibilities to the machine equipped with such a control device.

Thus this very simple control device, which may be very robust, is extremely versatile and enables a plurality of different commutations to be obtained, enabling any one skilled in the art to solve any switching problems which may occur in domestic electric apparatus.

What is claimed is:

1. A switch for controlling the operating cycles of an appliance having a timer and a plurality of operating cycles such as a washing machine; said switch comprising a base plate, a plurality of normally open contact means mounted on one side of said base plate, each said contact means having an associated push button means, said push button means including a pin member slideably mounted in said base plate and normally projecting beyond the opposite surface of said base plate, a removable control member, means for orthogonally guiding said control member into operative position relative to said base plate upon application of said control member, said control member having a plurality of openings therein for selectively receiving said pins whereby said selected pins and associated contact means remain in their normal position, indication means on said control member for identifying the operation to be performed by the appliance, and means for holding said control member in operative position with said base plate, said last-named means comprising a permanent magnet connected with said base plate, and said control member being at least partly constituted of ferromagnetic material.

2. A switch according to claim 1 wherein said control member is plate shaped having at least one straight edge and said means for holding said control member comprises a closed frame in juxtaposition with said base plate, said frame having a pair of opposed slots for receiving a projecting portion of said control member, said base plate having at least one said push button means in the plane defined by said slots, and said magnet being at least partly within said plane whereby said straight edge is drawn against said push button when said control member is juxtaposed relative to said base plate.

References Cited by the Examiner

UNITED STATES PATENTS

| | | |
|---|---|---|
| 2,055,031 | 9/1936 | Hutchings. |
| 2,662,944 | 12/1953 | Carney et al. _____ 200—46 |
| 2,915,243 | 12/1959 | Lapointe _____ 235—61.11 |
| 3,031,799 | 5/1962 | Bradsby _____ 317—159 X |
| 3,051,380 | 8/1962 | Oldenburg _____ 235—61.11 |
| 3,142,771 | 7/1964 | Wendt _____ 68—12 X |
| 3,145,326 | 8/1964 | McGannon _____ 317—159 X |

FOREIGN PATENTS

| | | |
|---|---|---|
| 831,139 | 3/1960 | Great Britain. |
| 344,394 | 3/1960 | Switzerland. |

KATHLEEN H. CLAFFY, *Primary Examiner.*

BERNARD A. GILHEANY, ROBERT K. SCHAEFER, *Examiners.*